US 7,986,980 B2

(12) United States Patent
Nurminen et al.

(10) Patent No.: US 7,986,980 B2
(45) Date of Patent: Jul. 26, 2011

(54) MULTIRADIO POWER MANAGEMENT (75) Inventors: Jukka M. Nurminen, Tampere (FI);
Petri A. Tuominen, Ruutana (FI)

(73) Assignee: Nokia Corporation, Espoo (FI)

( * ) Notice: Subject to any disclaimer, the term of this patent is extended or adjusted under 35 U.S.C. 154(b) by 796 days.

(21) Appl. No.: 11/904,740

(22) Filed: Sep. 28, 2007

(65) Prior Publication Data

US 2009/0088199 A1   Apr. 2, 2009

(51) Int. Cl.
*H04B 1/40* (2006.01)
(52) U.S. Cl. .................. 455/574; 455/140; 455/67.11
(58) Field of Classification Search ............ 455/553.1, 455/572, 574, 67.11, 132, 140, 226.1
See application file for complete search history.

(56) References Cited

U.S. PATENT DOCUMENTS

| | | | |
|---|---|---|---|
| 6,963,747 B1 * | 11/2005 | Elliott | 455/450 |
| 6,993,357 B1 * | 1/2006 | Ito et al. | 455/552.1 |
| 7,432,955 B2 * | 10/2008 | Anzai | 348/211.2 |
| 7,626,973 B2 * | 12/2009 | Palin et al. | 370/347 |
| 7,653,419 B2 * | 1/2010 | Nagasawa | 455/574 |
| 2005/0215227 A1 * | 9/2005 | Vu et al. | 455/343.2 |
| 2007/0142098 A1 * | 6/2007 | Behzad et al. | 455/574 |
| 2008/0108396 A1 * | 5/2008 | Lundqvist | 455/574 |
| 2008/0132264 A1 * | 6/2008 | Krishnamurthy et al. | 455/522 |
| 2008/0161041 A1 * | 7/2008 | Pernu | 455/553.1 |

OTHER PUBLICATIONS

Bahl, P., et al., "Reconsidering Wireless Systems with Multiple Radios", 8 pgs.
Zhang, J., et al., "TMMAC: An Energy Efficient Multi-Channel MAC Protocol for Ad Hoc Networks", 8 pgs.
Zheng, R., et al., "On-demand Power Management for Ad Hoc Networks", IEEE Infocom 2003, 11 pgs.

* cited by examiner

*Primary Examiner* — Blane J Jackson
(74) *Attorney, Agent, or Firm* — Harrington & Smith (57) ABSTRACT A method, apparatus, memory embodying a program, and others are described determining a first traffic pattern for a first radio access system of an apparatus, determining a second traffic pattern for a second radio access system of the apparatus, and restricting operation of at least one non-radio sub-system of the apparatus based on the first traffic pattern and on the second traffic pattern. It is notable that the first and second traffic patterns span a common time interval. In a multiradio device, the traffic patterns are generated by a multiradio controller in order to inhibit instances where one radio would interfere in time and frequency with another. Those traffic patterns are used by a resource manager to manage power draw from the battery by delaying full operation of other sub-systems to a time when the traffic patterns indicate no radio is scheduled. Another use of the traffic patterns for power savings is also detailed.

21 Claims, 6 Drawing Sheets

MULTIRADIO POWER MANAGEMENT

TECHNICAL FIELD

The exemplary and non-limiting embodiments of this invention relate generally to portable devices that include more than one radio access systems that operate on different networks or channels. More particularly, embodiments of this invention enable power management in such a device that further includes an additional component such as a camera.

BACKGROUND

There are new wireless data services routinely becoming available even as wireless voice services improve. Increasingly to take advantage of these data and improved voice services, particularly simultaneous use of such services, means that there must be several different ways to establish communications between the network and the user mobile device or between mobile devices. To this end there have been developed what are known as multiradio mobile devices. These multiradio devices include several different radio access systems that enable the use of diverse mobile services.

Examples of such different networks include mobile telephony networks (e.g., evolved universal terrestrial radio access network E-UTRAN, global system for mobile communication GSM), wireless local area networks WLANs and WiFi networks, and piconets (e.g., Bluetooth), to name a few. Often a multiradio device will have one radio for voice (or combined voice/data) service over a traditional cellular network and another radio for data communications over another network (e.g., WLAN), but multiradio devices need not have those two types of radios. A multiradio device may have radio for communication for access to a WLAN access point, a Bluetooth radio for access to a printer or headset, and no access to traditional voice service over cellular. Similarly, a mobile terminal/mobile station may have a GSM modem, a UTRAN modem and a digital video broadcast for handhelds DVB-H modem. An individual multiradio device may also have more than one radio for communicating over a single network, such as a mobile station having two cellular radios so as to avoid switching between an active Node B and another Node B in preparation for a handover. The hardware (and related software) for accessing these various networks is termed a radio access system RAS, and each has a modem and a transceiver.

For the case where the two RASs operate under control of different wireless networks, the times during which one RAS may be scheduled to receive or authorized to send by a first network is generally not coordinated with the times the other modem is scheduled to receive or authorized to send by another network. This leads to the potential for the RASs to interfere with one another when transmitting or receiving simultaneously, in that sometimes the different networks use frequency ranges that overlap and each network might schedule/authorize the different RASs of the multiradio device to transmit/receive at the same time and frequency. The result is wasted bandwidth due to data collisions from different RASs of the same wireless device.

Several solutions to the collision/interference problem are presented in U.S. patent application Ser. Nos. 11/647,620 and 11/647,615, each filed on Dec. 29, 2006 and respectively entitled "Multiradio Synchronization and Scheduling Control" and "Apparatus, Method and Computer Program Products providing Pattern masking and Traffic Rule Matrix Scheduling for Multiradio Control". Both those co-pending applications are hereby incorporated by reference.

To summarize, the above references describe a controlling mechanism in a multiradio device that solves the above interoperability problems in the air interface. These are termed multiradio controllers MRCs, and they calculate suitable time slots for each radio access system to send and receive information, thereby avoiding collisions when time and frequency domains schedules overlap. Because the times of the different networks are not slaved to a common clock, synchronizing the transmission and receptions scheduled in those different networks is an important part of the collision avoidance solution, and is detailed with particularity in each of those above references.

Now the majority of multiradio devices are owned and operated by individuals as mobile stations/mobile telephones. These end users often prefer various additional functionality in their multiradio devices, some of which are power intensive (e.g., a camera with flash). Other such functions include image processing, creating and editing documents, and the like. Term these non-radio sub-systems. Because these user devices are portable, they are powered by a limited power supply, typically galvanic/battery. This additional non-radio functionality becomes important for the devices from a commercial perspective and the desire for multiple RASs is also on the rise. Both the multiple RASs and the non-radio sub-systems draw from the same limited power source. This leads to a degenerating problem of power consumption in multiradio devices.

What is needed in the art is a way to decrease or better manage power consumption in a portable multiradio device.

SUMMARY

In accordance with an exemplary embodiment of the invention is a method that includes determining a first traffic pattern for a first radio access system of an apparatus, determining a second traffic pattern for a second radio access system of the apparatus, and restricting operation of at least one non-radio sub-system of the apparatus based on the first traffic pattern and on the second traffic pattern. It is notable that the first and second traffic patterns span a common time interval.

In accordance with another exemplary embodiment of the invention is an apparatus that includes a memory, a first radio access system, a second radio access system, a non-radio sub-system, and at least one processor. The (at least one) processor is configured to determine a first traffic pattern for the first radio access system and store it in the memory, to determine a second traffic pattern for the second radio access system and store it in the memory, where the first and second traffic patterns span a common time interval, and further to restrict operation of the non-radio sub-system based on the first traffic pattern and on the second traffic pattern.

In accordance with yet another exemplary embodiment of the invention is a memory embodying a computer program of instructions for causing a digital processor to perform actions directed toward restricting operation of a non-radio sub-system of an apparatus. In this embodiment, the actions includes determining a first traffic pattern for a first radio access system of an apparatus, determining a second traffic pattern for a second radio access system of the apparatus where the first and second traffic patterns span a common time interval, and restricting operation of at least one non-radio sub-system of the apparatus based on the first traffic pattern and on the second traffic pattern.

In accordance with yet another exemplary embodiment of the invention is a resource manager that includes a first input coupled to read from a memory a first traffic pattern for a first radio access system of an apparatus and also to read a second traffic pattern for a second radio access system of the apparatus wherein the first and second traffic patterns span a common time interval. The resource manager also includes logic circuitry configured to determine how to restrict operation of a non-radio sub-system of the apparatus based on the first traffic pattern and on the second traffic pattern, and a control output configured to output to the non-radio sub-system a control signal to restrict the operation as determined by the logic circuitry. In a particular embodiment, the resource manager is an integrated circuit.

In accordance with yet another exemplary embodiment of the invention is a device that that includes memory means, first radio access means, second radio access means, a non-radio sub-system, and processing means. The processing means is for determining a first traffic pattern for the first radio access means and for storing it in the memory means, for determining a second traffic pattern for the second radio access means and for storing it in the memory means, in which the first and second traffic patterns span a common time interval. The processing means is further for restricting operation of the non-radio sub-system based on the first traffic pattern and on the second traffic pattern.

In a particular embodiment of the device embodiment immediately above, the memory means includes a computer readable memory, the first radio access means comprises a cellular telephony radio, the second radio access means comprises one of a piconet radio or a wireless local area network radio, the non-radio sub-system comprises one of a camera and a flash, and the processing means comprises a multiradio controller for determining and storing the traffic patterns and a resource manager for determining the restricted operation and for sending a control signal to the non-radio sub-system.

In accordance with another embodiment of the invention is a method that includes determining authorized transmit and receive instances for each of N radio access systems of an apparatus, wherein N is an integer at least equal to two. Further in the method it is determined that at least one of the authorized transmit or receive instances of a first one of the N radio access systems will potentially interfere with at least one of the authorized transmit or receive instances of another one of the N radio access systems. The first radio access system is inhibited during the at least one potentially interfering authorized transmit or receive instances, and operated in a reduced power mode during the inhibited transmit or receive instance based in the inhibiting.

In accordance with another embodiment of the invention is an apparatus that includes a memory, and N radio access systems, wherein N is an integer at least equal to one. The device further includes at least one processor that is adapted to determine authorized transmit and receive instances for each of the N radio access systems, adapted to determine that at least one of the authorized transmit or receive instances of a first one of the N radio access systems will potentially interfere with at least one of the authorized transmit or receive instances of another one of the N radio access systems, adapted to inhibit the first radio access system during the at least one potentially interfering authorized transmit or receive instances, and adapted to operate the first radio access system in a reduced power mode during the inhibited transmit or receive instance based in the inhibiting.

In accordance with another embodiment of the invention is a memory embodying a computer program of instructions for causing a digital processor to perform actions directed toward operating a radio access system of an apparatus in a reduced power mode. In this embodiment the actions include determining authorized transmit and receive instances for each of N radio access systems of an apparatus, wherein N is an integer at least equal to two; determining that at least one of the authorized transmit or receive instances of a first one of the N radio access systems will potentially interfere with at least one of the authorized transmit or receive instances of another one of the N radio access systems; inhibiting the first radio access system during the at least one potentially interfering authorized transmit or receive instances; and operating the first radio access system in a reduced power mode during the inhibited transmit or receive instance based in the inhibiting.

In accordance with another embodiment of the invention is a resource manager that includes a first input coupled to read from a memory N traffic patterns for respective N radio access systems of an apparatus that span a common time interval; logic circuitry configured to determine that an authorized transmit or receive instance of the traffic pattern for a first one of the N radio access systems will potentially interfere with an authorized transmit or receive instance of the traffic pattern of another one of the N radio access systems; and a control output configured to inhibit the first radio access system during the at least one potentially interfering authorized transmit or receive instances and to operate the first radio access system in a reduced power mode during the inhibited transmit or receive instance.

In accordance with another embodiment of the invention is a device that includes memory means such as for example a computer readable memory, and N radio access means such as N wireless transceivers. N is an integer at least equal to two. The device further includes processing means adapted to determine authorized transmit and receive instances for each of the N radio access systems, to determine that at least one of the authorized transmit or receive instances of a first one of the N radio access systems will potentially interfere with at least one of the authorized transmit or receive instances of another one of the N radio access systems, to inhibit the first radio access system during the at least one potentially interfering authorized transmit or receive instances, and to operate the first radio access system in a reduced power mode during the inhibited transmit or receive instance based in the inhibiting. The processing means may be, for example, a multiradio controller adapted to determine and to store N traffic patterns from the respective N authorized transmit or receive instances, and a resource manager adapted to cause the first radio access system to operate in the reduced power mode.

Further details as to various embodiments and implementations are detailed below.

DETAILED DESCRIPTION

Embodiments of this invention provide a technique to decrease power consumption in multiradio mobile devices by extending the usage of available information for power control purposes. In the above-incorporated references, it may be considered that the multiradio controllers provide so-called traffic patterns to radio access systems (RAS) for telling when a particular radio access system is enabled and disabled to send and receive data. This is detailed briefly with respect to FIG. 1 and in more detail with respect to FIG. 4, and the incorporated references provide a greater level of detail as to synchronizing among the transmission and reception instances of the different RASs of a single device. Synchronization addresses the different clocks used by the different networks and also any bus arbitration issues that arise due to the circuit architecture of the portable user device itself. In U.S. patent application Ser. No. 11/647,620 referenced above there is detailed a synchronization and scheduling controller embodied as an application specific integrated circuit to address the synchronization issue.

Generally, that co-pending application details that a first set of timeslots for a first modem of a device is mapped to a master clock, that a second set of timeslots for a second modem of the device is also mapped to the master clock; and inhibiting one or both of transmission or reception of the first modem during an authorized timeslot of the first set that overlaps with an authorized timeslot of the second set. These sets of timeslots are traffic patterns.

Figure 1:
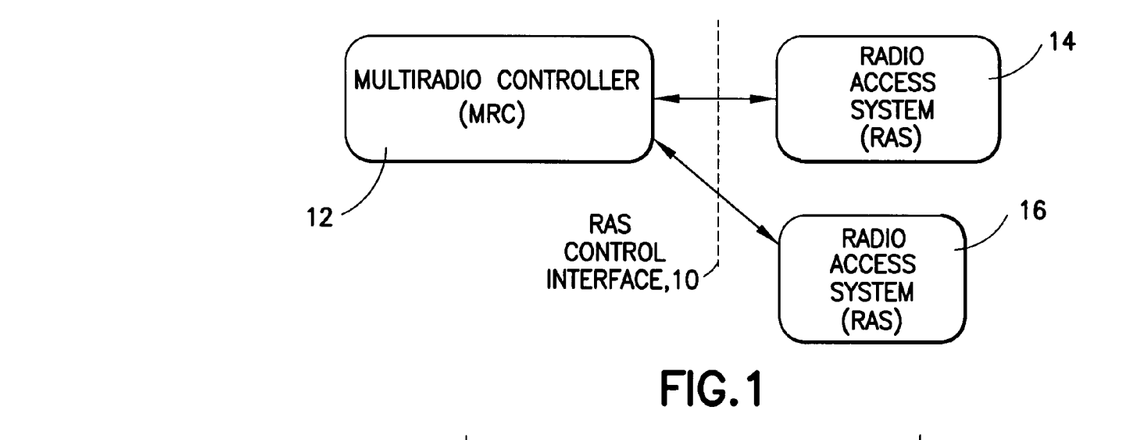
FIG. 1 is a high level schematic diagram of distinct components within a portable device on which FIG. 2 expands.

FIG. 1 is a high level schematic diagram of distinct components within a portable device such as a mobile station. In this simplified drawing there is a radio access system RAS control interface 10 between a multiradio controller MRC 12 and each of two radio access systems 14, 16. The MRC 12 may be a processor such as a central processing unit that controls the multiple RASs in the device. The RAS is a functional unit that encompasses a transceiver including a modem. Functionally, the MRC manages interoperability issues between modems of the different RASs on a radio front-end level. In that respect it assures the synchronization noted above.

Each RAS 14, 16 signals to the MRC 12 specific instances in which it is authorized to transmit or receive by whatever transmission protocol is used by that RAS's network. For example, if one RAS 14 is operating on the UTRAN system, it will receive its scheduling grants for uplink transmissions and be informed of when it is scheduled to receive its downlink data by the network base station controlling it. There may also be periodic instances during which the RAS 14 is expected to listen to a different broadcast channel such as a paging or synchronization channel, which are also given by the network but generally follow a more periodic schedule. Each of these transmit and/or receive commands or instances pass over the RAS control interface 10 and are collected by the MRC 12. Note that there is no predetermined routine schedule for the RAS 14 that the network provides. At best a partial schedule may be known well in advance for some receptions such as for example when the RAS 14 is scheduled to listen to a broadcast channel. In that instance the mobile station will typically retune that RAS 14 to the broadcast channel and will be unavailable to receive data or other information on the normal traffic channels of the network during that time. But the traffic pattern for any given RAS 14, 16 is the sum of all its transmit and receive instances (for a specific interval) as modified/limited by the MRC 12 for collision avoidance with other RASs of the same device. The traffic pattern can be known only a very short time in advance, for at any given moment the mobile station may or may not have data to transmit from the RAS 14 and so may or may not have granted uplink resources, and the same goes for downlink traffic from the base station to the mobile station through that same RAS 14. The transmit and receive instances are known in the mobile station with very little advance time, and those instances do not generally repeat as a pattern across consecutive intervals due to changing traffic conditions.

To consider another example, assume the other RAS 16 is a Bluetooth transceiver. There is no network controlling node that gives scheduling information, but instead depending upon whether a particular device (the RAS 16) is master or slave it will contend with other Bluetooth devices on the same piconetwork for transmission instances, at least during what is termed in Bluetooth the contention intervals. Those transmissions are ad hoc in that they are not scheduled in advance but the competing devices must 'contend' for transmit slots. Wireless local area networks WLANs also operate at least in part on an ad hoc transmission basis with different wireless devices contending for transmission slots.

Like the scheduling grants given by the UTRAN network to the first described RAS 14 in the example above, the portable device cannot know in advance the overall traffic pattern of any given RAS except in the very near future. For current generation cellular networks the traffic pattern may be known in advance to only one or a few tenths of a second. Traffic patterns are further detailed below by example, and as will be seen, these traffic patterns are sufficient for the advantages in power savings detailed below even though they are known so little time in advance.

The MRC 12 determines the traffic patterns (see FIG. 4) from the authorized transmit and receive instances for each of the RASs 14, 16 that are passed over the RAS control interface 10. These teachings extend beyond the synchronization issues detailed in the above referenced applications and use the traffic patterns for power management purposes to decrease overall power consumption within the device in which the RASs 14,16 lie. A particularly important aspect for using traffic patterns for power management is increased predictability.

Figure 2:
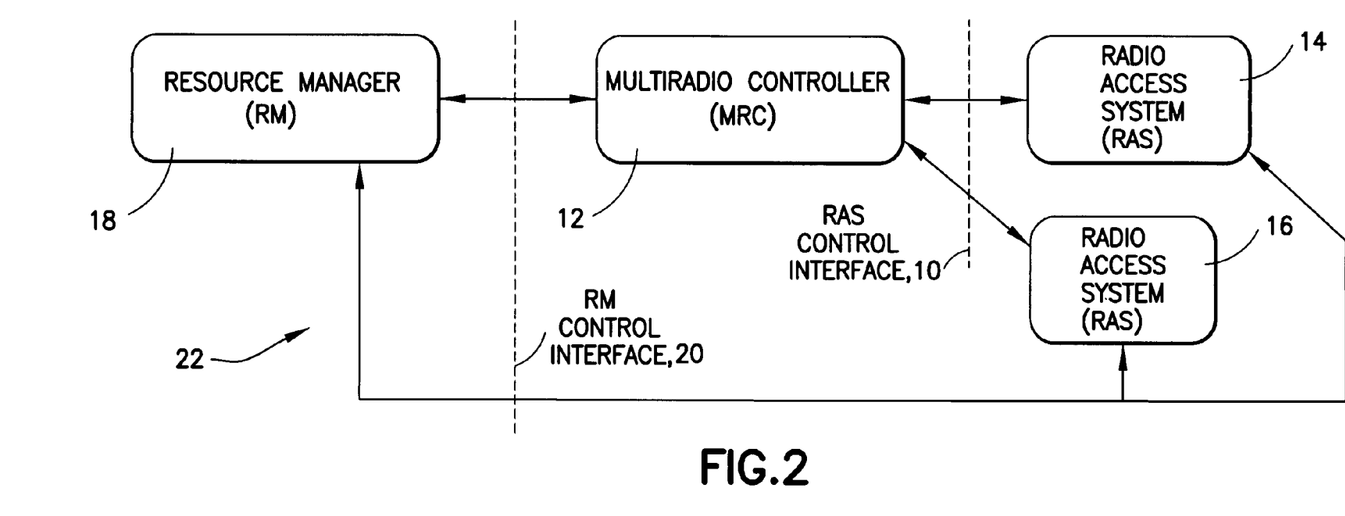
FIG. 2 is similar to FIG. 1 but showing a resource manager according to an embodiment of the invention.

FIG. 2 is a schematic diagram similar to FIG. 1, but in addition to the MRC 12 and the RASs 14,16 FIG. 2 illustrates a resource management (RM) unit 18 or function in a mobile device 22. The RM unit 18 takes care of power management and is coupled to the MRC 12 through a RM control interface 20. Recognize that the MRC 12 and the RM 18 may be embodied on the same integrated circuit, such as different circuit-defined portions of the same processor chip. Alternatively, they may be implemented solely as software stored on a memory and executed by a general purpose processor or a digital signal processor within the device 22, as a combined or separate application specific integrated circuits, or some combination of hardware and software either individually or combined.

Figure 3:
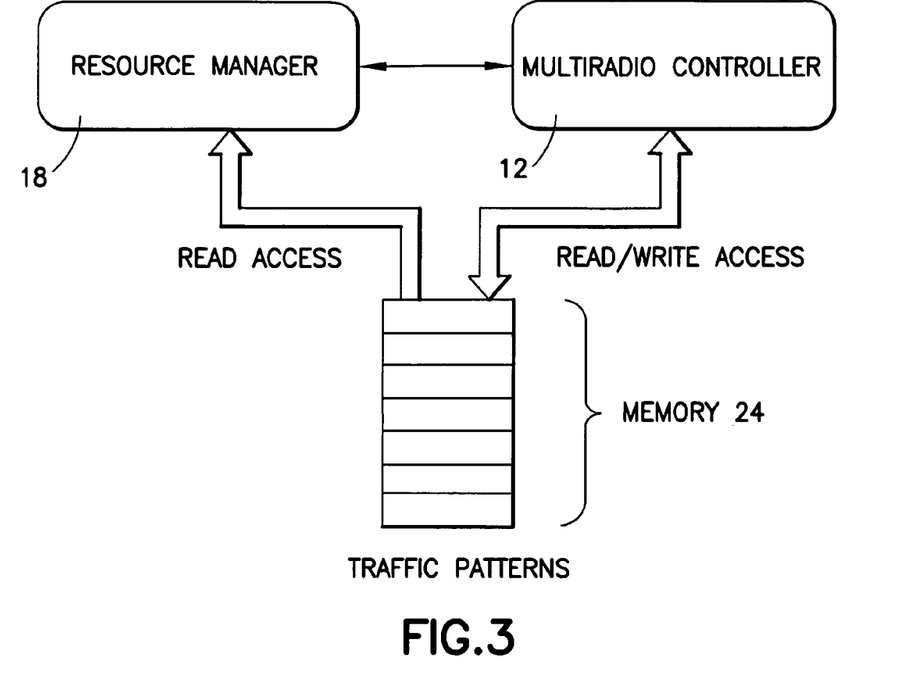
FIG. 3 is a schematic illustration of a resource manager reading traffic patterns from a local memory that were written by a multiradio controller, according to an embodiment of the invention.

FIG. 3 illustrates how a traffic pattern database is built into a memory 24 and used in according to an embodiment. In addition to the RASs 14, 16, the traffic pattern is visible for the RM 18 and it can use the traffic pattern information while controlling the system. A traffic pattern describes how the RASs to which it relates can be transmitting and receiving within a known time in the future. From FIG. 1, the MRC 12 receives from each RAS 14,16 its transmit and receive instances across the RAS control interface 10, and at FIG. 3 writes the resulting traffic pattern into a memory 24. As seen at FIG. 3, the resource manager unit 18 also has read access to that traffic pattern database 24. The MRC 112 has both read and write access to it, since it is updated fairly frequently by the MRC 12 given the short advance time that traffic transmit and receive instances are generally learned. By the arrangement of FIG. 3, the resource manager 18 can obtain a traffic pattern from the MRC 12 with one memory read-write sequence. If the RM 18 maintains its own database/table for the traffic patterns, it is seen to require several memory read-write sequences before a traffic pattern can be known to the RM 18 side of the RM control interface 20. It is undesirable from a power consumption point of view for keeping parallel databases/tables for traffic patterns, since the MRC 12 should also have read access to those traffic patterns in order to control the RASs for collision avoidance purposes as detailed in the incorporated references.

Figure 4:
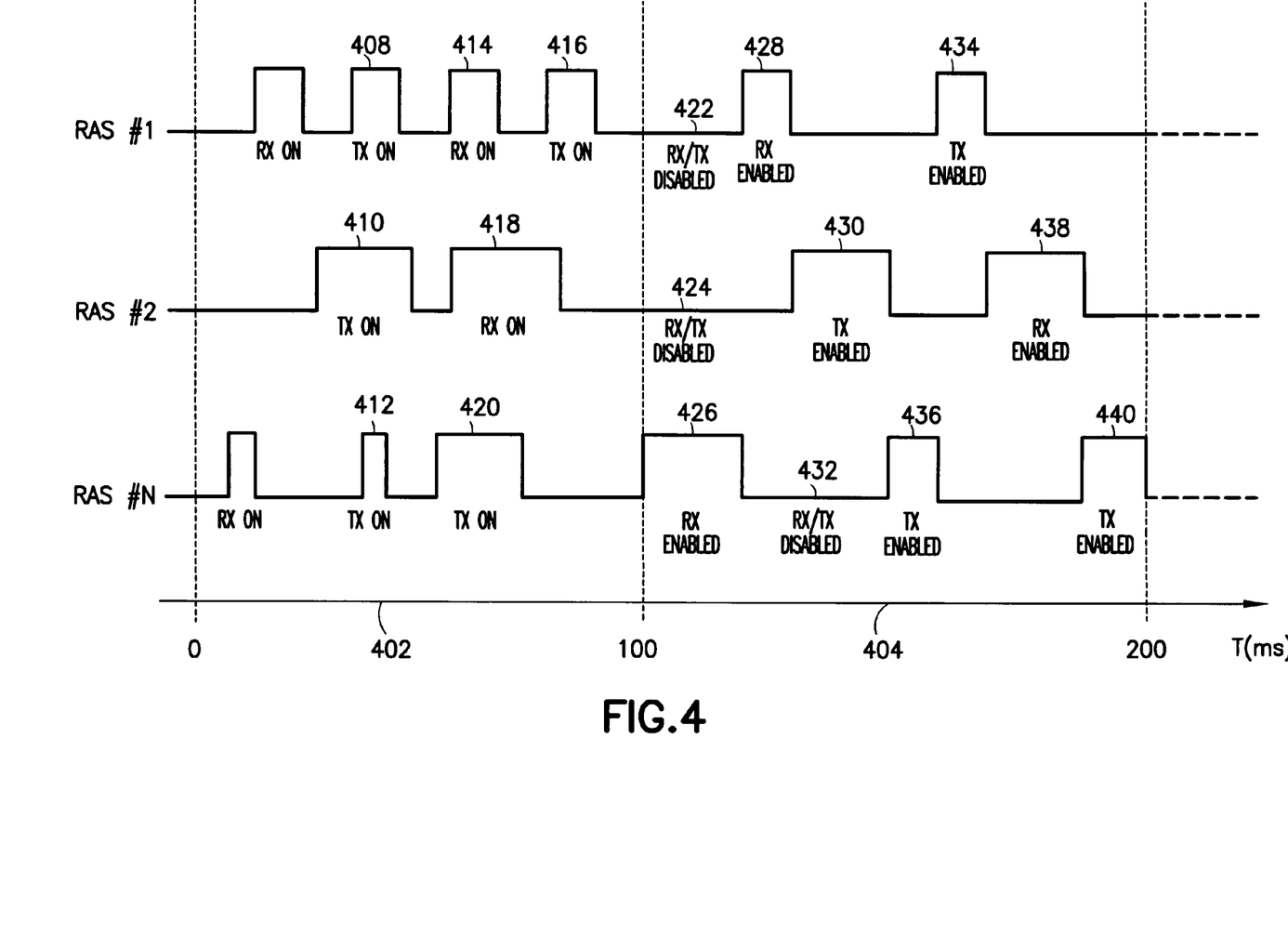
FIG. 4 is a timing diagram plotting traffic patterns for three different radio access systems of a device.

FIG. 4 illustrates an example of possible traffic patterns for three RASs:

RAS#1, RAS#2 and RAS#N. There may of course be only two RASs or more than the illustrated three RASs. FIG. 4 illustrates two intervals 402, 404, each 100 milliseconds long. The first interval begins at time zero, and there is no previous knowledge of transmit and receive instances from any previous interval. So during that first interval 402 the plot of FIG. 4 illustrates each and every transmit and receive instance for the associated RAS on its associated network. As can be seen, there is the potential for interference in several places. RAS#1 transmits 408 at a time overlapping the transmission 410 from RAS#2 and also the transmission 412 from RAS#N. If any pair of these also frequency overlap, there will be collision and at least one and likely both signals will not get through. Likewise later in that same first interval, RAS#1 has a reception instance 414 that overlaps in time with a reception instance 418 of RAS#2 and a transmit instance 420 of RAS#N; and RAS#1 has another transmission instance 416 that overlaps with that same reception instance 418 of RAS#2. To the extent these overlap in frequency there will be collisions and signal loss. But during the first interval 402 the MRC 12 is in a 'learning mode' and has not yet compiled a sufficient history by which to inhibit one or more of the RASs to avoid those collisions. There is not enough knowledge yet in the MRC 12 and so it is unable to draw up traffic patterns. As can be seen, traffic patterns are not given by the networks in which the RASs operate but by the MRC. The MRC takes the transmit and receive instances and inhibits one or more RASs as necessary to avoid collisions. The same traffic patterns used for collision avoidance are used herein for power management in the portable user device 22.

Now consider the second interval 404 of FIG. 4, which follows the learning period of the first 100 ms. After the traffic pattern is taken into use following the first interval 402, the receive/transmit behavior of the mobile device is known within the next 100 ms, the next interval 404. This means that the scheduled instances of transmit and receive for each RAS is known (since the pattern only extends out another 100 msec), and also that certain of those scheduled instances may be inhibited for a certain RAS for collision avoidance purposes. Specifically, during the second interval 404, network-authorized reception and transmission instances from RAS#1 and RAS#2 (instances 422 and 424) are disabled by the MRC 12 since those would collide with the reception instant 426 of RAS#N. The receive instant 428 for RAS#1 is allowed by the MRC 12, there is no potential for collision between that instance 428 and the transmission instance 430 for RAS#2 so that also is allowed by the MRC 12, but RAS#N is disabled 432 during those instances since it would collide with one or the other of the RAS#1 or RAS#2 instances 428, 430. Each of the other instances 434, 436, 438 and 440 are spaced from one another in time and so the MRC 12 does not inhibit any of them; there is no potential for collision.

So with the MRC-generated traffic patterns as shown in the second interval 404, any individual RAS may be scheduled by the network to transmit or receive at a given instant in time but inhibited by the MRC 12 from doing so, for collision avoidance purposes if both time and frequency would otherwise overlap as they sometimes might. During this time 404, when a traffic pattern indicates that a RAS is not allowed to send or receive (ie, at instances 422 for RAS#1, 424 for RAS#2 and 432 for RAS#N), according to an embodiment of the invention the RM 18 is used to optimize the system resource usage for power consumption purposes. For example, the RM 18 can either switch off or decrease clock frequencies and voltages from RASs and related system entities like memories according to the traffic pattern. Note that this switching off or decreasing frequency is not limited to the inhibited periods 422, 424 and 432. The RM 18 can read the entire traffic pattern for each RAS and control each RAS to operate at that reduced power-consumption mode during the times it is inhibited 422, 422, 432 and also during the times it is not scheduled (e.g., between 428 and 434 and also after 434 for RAS#1); the traffic pattern for each RAN teaches both pieces of information to the RM 18. Because the next traffic pattern is known in advance, say $t_{100}-t_A$, the RM 18 has sufficient time to prepare other controlling decisions, like memory management issues, which are partly based on the next effective traffic pattern.

In the above formulation, the second traffic pattern (that for RAS#2) has both network-authorized transmit and receive instances 430 and 438, and a network-authorized instance that is inhibited 424 by the portable user apparatus itself via the MRC 12. The RM 18 restricts operation of the component, the clock of RAS#2 for example, based on the traffic pattern for RAS#2. While that traffic pattern is derived with some reference to the traffic pattern for RAS#1, additional and more substantial power savings may be obtained for other non-RAS components within the apparatus/device 22. For example, assume a camera with a flash is also within the apparatus 22. This is a high current draw item. Since by FIG. 3 the RM 18 has read access to each of the RAS traffic patterns produced by the MRC 12, it can also make decisions to operate other such high-draw components fully only at those times when there is no reception or transmission instance in the traffic pattern of any RAS. Alternatively, it may only ensure that there is no transmission instance as transmission is a higher current draw than reception.

Assume for another example that in FIG. 4 the instance 440 was not scheduled for RAS#N, and instead during that period the traffic patterns of RAS#1, RAS#2 and RAS#N each indicated that there would be no transmit or receive activity during that period. The RM 18 may have control over those other components such as the camera and flash and allow them to operate only at times determined with reference to each of the traffic patterns so as to better average current draw from the battery of the apparatus. For the majority of the interval 404 the various RASs alternate in their transmit receive instances, and so the draw on the battery is fairly constant. Restricting operation of the camera flash to only the latter portion of the interval 404, where for this example it is assumed that no RAS has a transmit or receive instant (assume 440 is not enabled or scheduled), then the net draw from the battery is more normalized than it otherwise would be with a spike in current draw when the flash is operated simultaneously with one of the RASs. In that instance each of the RASs could be operated in a restricted mode, since the flash typically would draw more current than any single RAS. The restricted operation of all three would better tend to balance the high-current flash. The net effect is attenuation of current peaks drawn from the battery, which leads to longer life of the power supply. While a flash is a user-operated component and one seeks to make these functions as user friendly as possible, it is seen that the traffic patterns are on such a tight time constraint due to network needs for adaptive scheduling that delaying flash actuation less than 100 msec from the time a user depressed the actuator would not be noticeable by the user or have an adverse effect on the resulting photo. In this manner, other non-RAS components can be operated in a restricted mode with reference to only one of the traffic patterns, or with reference to two or more or all of the RAS traffic patterns.

Figure 5:
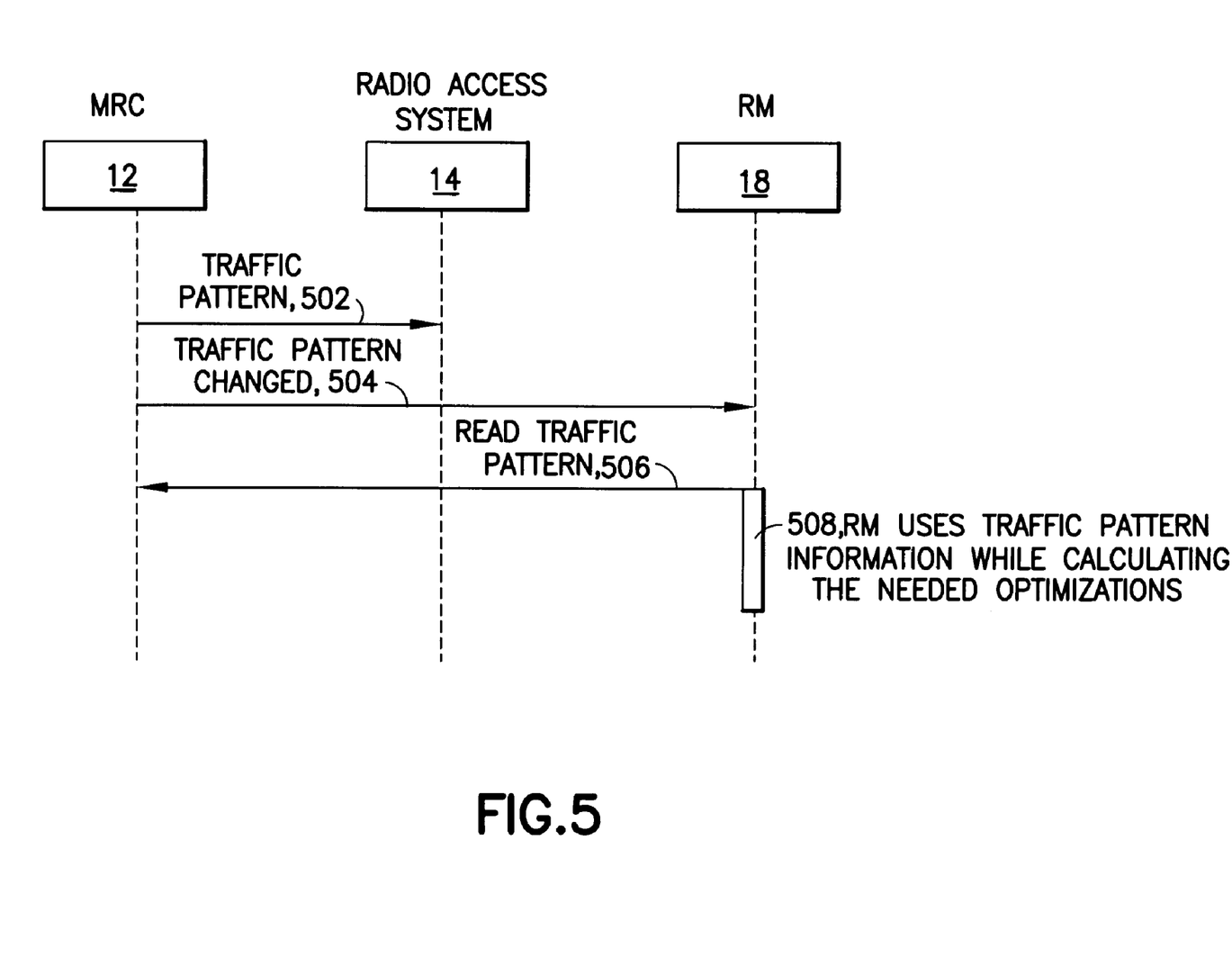
FIG. 5 is a signaling diagram showing novel signaling between the multiradio controller and the resource manager when the multiradio controller writes a new traffic pattern to the memory according to an embodiment of the invention.

FIG. 5 is a signalling diagram internal of the device illustrating how information is passed among and between the various components when a new traffic pattern is available. Not shown are the network-authorized transmit and receive instances that the MRC 12 uses to build the traffic pattern. Once built, the MRC 12 uses that new traffic pattern 502 to the appropriate RAS 14 as detailed above. The MRC 12 also sends an indication 504 to the RM 18 about the new traffic pattern, preferably when the new traffic patterns 502 are sent to relevant RAS 14. When the traffic pattern has been read, which the RM 18 may signal to the MRC 12 as a failsafe option, the RM 18 can calculate 508 how to optimize the usage of physical resources. Knowledge about behavior of the radio access systems within the next $\Delta t = t + t_A$ enables the resource management unit 18 to, e.g., postpone some other activities, like shooting still picture. This is generally termed as operating a non-RAS sub-system with reference to at least one of the traffic patterns. This enables the overall apparatus 22 to cut off energy consumption spikes and to stress the energy sources smoothly, which extends the battery lifetime.

One clear advantage is that this invention decreases overall power consumption of mobile device, because it provides a means to make more intelligent controlling decisions by utilizing available information of the near-future RASs' behavior. Moreover, it should be noted that embodiments of this invention extends the usage of available information, because traffic patterns must be calculated anyway for the multiradio-based communication purposes as detailed in the above-referenced US patent applications for the purposes of collision avoidance. The increased predictability due to the traffic patterns enables more intelligent power management decisions, which is a clear advantage, if compared with traditional reactive controlling systems.

It is recognized that embodiments of the invention also use more power in that the RM 18 must calculate or otherwise determine what restrictions to make with reference to a traffic pattern. However, such controlling algorithms are rather simple and straightforward, they are anticipated to draw a fairly minimal current, and so the net balance of power will be a power savings, likely a large savings.

Figure 6:
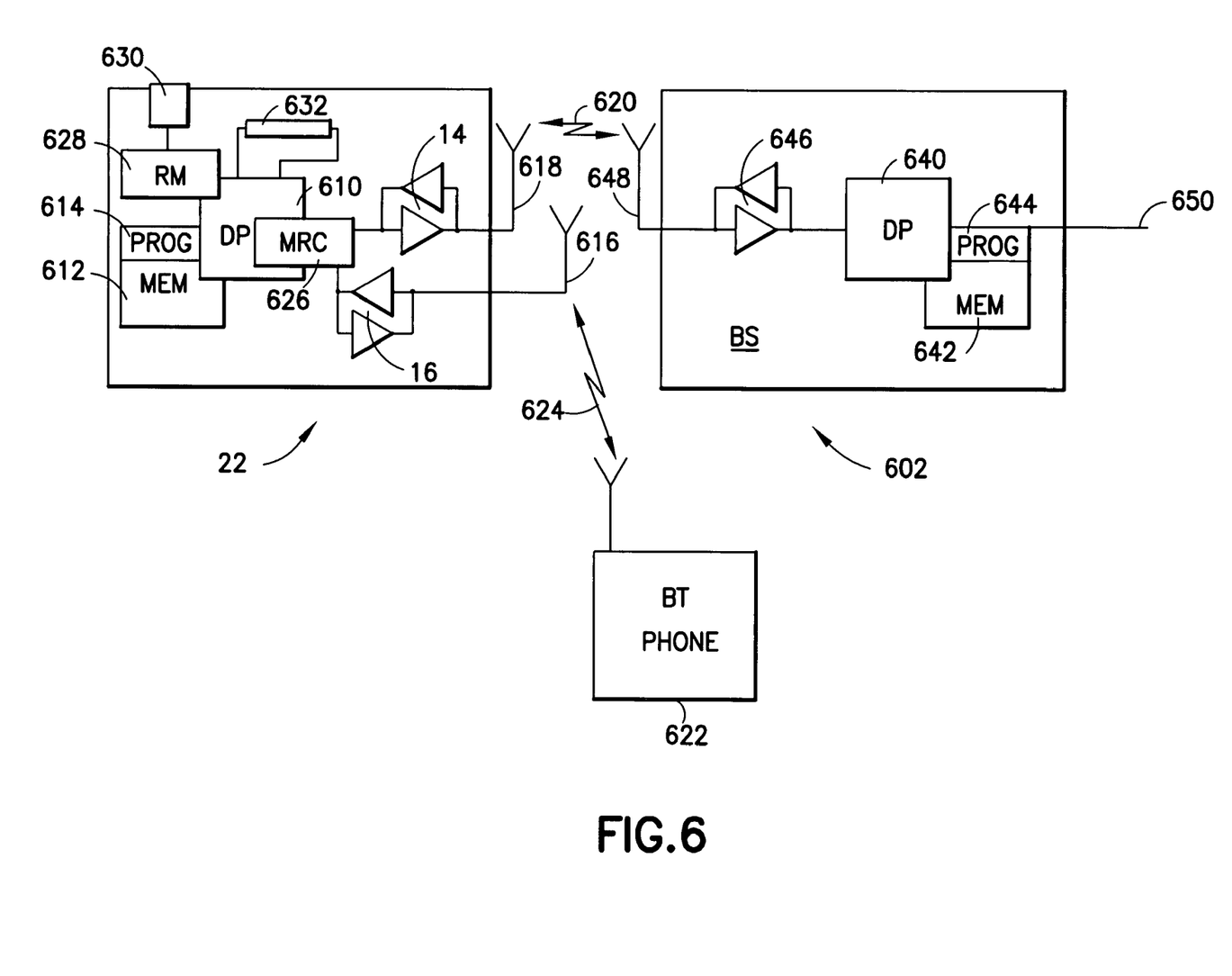
FIG. 6 is a schematic block diagram of a portable multiradio device in communication over two different networks via its two different radio access systems, according to an embodiment of the invention.

Reference is now made to FIG. 6 for illustrating a simplified block diagram of the overall apparatus 22 such as a mobile station in which the invention may be embodied. In FIG. 6 a first wireless network embodied as a base station 602 is adapted for communication with a first RAS 14 of the mobile station MS 22. The network may include (not shown) a gateway GW/serving mobility entity MME/radio network controller RNC or other radio controller function known by various terms in different wireless communication systems. Such a network schedules those transmit and receive traffic instances detailed above that are used to generate the traffic patterns, and E-UTRAN, UTRAN, GSM, and GERAN are well known cellular telephony network types along those lines. The MS 22 includes a data processor (DP) 610, a memory (MEM) 612 that stores a program (PROG) 613, and a first 14 radio access system, which may be coupled to one or more common or dedicated antennas 616, 618 suitable for bidirectional wireless communications over one or more wireless links 620 with the first network via the base station 602 (e.g., also known as a Node B in some networks).

Further in the apparatus 22 is a second radio access system 16 coupled to either one or more common or dedicated antennas 616, 618 for communication over a second (separate) network, embodied in FIG. 6 as a Bluetooth phone 622 coupled over a bidirectional wireless piconet link 624. Further in the multiradio apparatus 22 is a multiradio controller 626 and a resource manager 628 as previously detailed, which may be a part of the DP 610 or separate from it as with software stored on the memory 612 or separate application specific integrated circuits ASICs. The non-radio sub-system 630 is shown as coupled to the RM 628, and as above may be a camera, a flash, a camera and flash together, a video device, or any other such peripherals commonly known or yet to be developed for portable user communication devices 22. The electronics of the apparatus 22 are powered by a portable power source 632 such as a galvanic battery, a disposable fuel cell, or the like.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The base station BS 602 also includes a digital processor DP 640, a memory MEM 642 that stores a program PROG 644, and a suitable RF transceiver or radio access system 646 coupled to one or more antennas 648. The BS 602 may be coupled via a data path 650 (e.g., Iub or S1 interface) to the serving or other GW/MME/RNC (not shown). It is understood that each of the RASs include a modem and transceiver at least.

The program 614 stored in the memory 612 of the user apparatus 22 is assumed to include program instructions that, when executed by the DP 610 (and/or the MRC 626 and RM 630), enable the user device 22 to operate in accordance with the exemplary embodiments of this invention, as detailed above. Inherent in the DPs 610 and 640 (and one not shown in the BT phone 622) is a clock to enable synchronism among the various apparatus for transmissions and receptions within the appropriate time intervals and slots required, as the scheduling grants and the granted resources/subframes and ad hoc contention and transmission/reception intervals are time dependent.

The PROG 614 as well as the MRC 626 and RM 628 functions may be embodied in software, firmware and/or hardware, as is appropriate. In general, the exemplary embodiments of this invention may be implemented by computer software stored in the MEM 614 and executable by the MRC 626 and the RM 628 of the user device 22, or by hardware, or by a combination of software and/or firmware and hardware in that user device 22.

In general, the various embodiments of the portable multiradio device 22 can include, but is not limited to, mobile stations, cellular telephones, personal digital assistants (PDAs) having wireless communication capabilities, portable computers such as laptops having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEM 612 may be of any type suitable to the local technical environment and may be implemented using any suitable data storage technology, such as semiconductor-based memory devices, magnetic memory devices and systems, optical memory devices and systems, fixed memory and removable memory. The DP 610, MRC 626 and RM 628 may be of any type suitable to the local technical environment, and may include one or more of general purpose computers, special purpose computers, microprocessors, digital signal processors (DSPs) and processors based on a multi-core processor architecture, as non-limiting examples. The MRC 626 and/or the RM 628 may also be ASICs (individually or combined into one). Further in this regard it should be noted that the various logical step descriptions above and in the description of FIG. 7 below may represent program steps, or interconnected logic circuits, blocks and functions, or a combination of program steps and logic circuits, blocks and functions.

Figure 7:
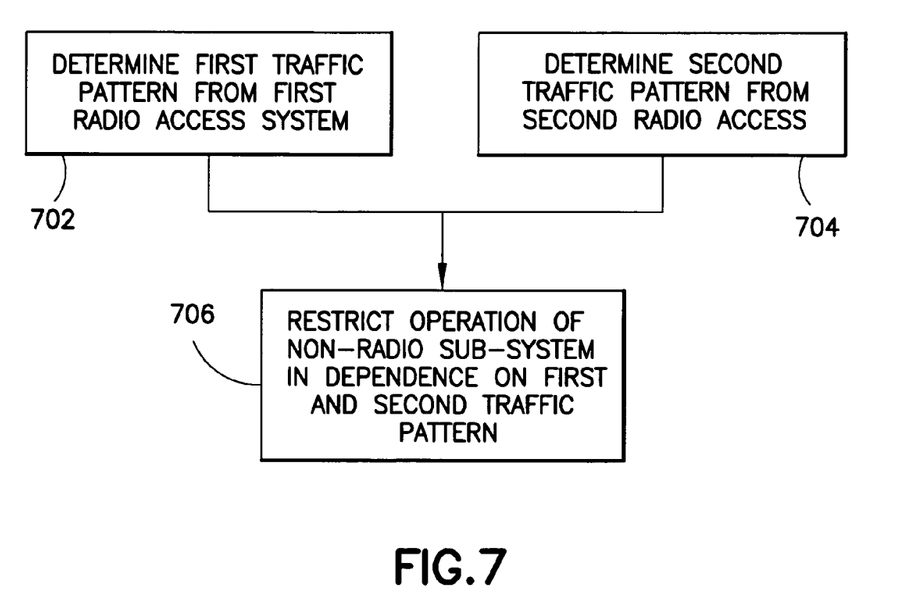
FIG. 7 is a process flow diagram illustrating an exemplary embodiment of the invention.

FIG. 7 illustrates such program or process steps according to an embodiment of the invention. At block 702, a first traffic pattern is determined for a first radio access system. At block 704, a second traffic pattern is determined for a second radio access system. While the determining may be in parallel as shown or serially, it is important to note that both the first and the second traffic patterns overlap one another in time; they span a common time interval as seen at FIG. 4 at interval 404. At block 706, operation of a non-radio sub-system is restricted in dependence on (based on) the first and on the second traffic pattern. Restricted operation may include shutdown of a component, or delaying a start of its operation, or operating it in a reduced power mode. Each of these is restricted operation. Whereas blocks 702 and 704 may be considered logic circuits for the MRC 12, block 706 may be considered a logic circuit for the RM 18 in which there is logic circuitry configured to determine how to restrict operations of a non-radio sub-system of the apparatus based on the first traffic pattern and on the second traffic pattern.

Figure 8:
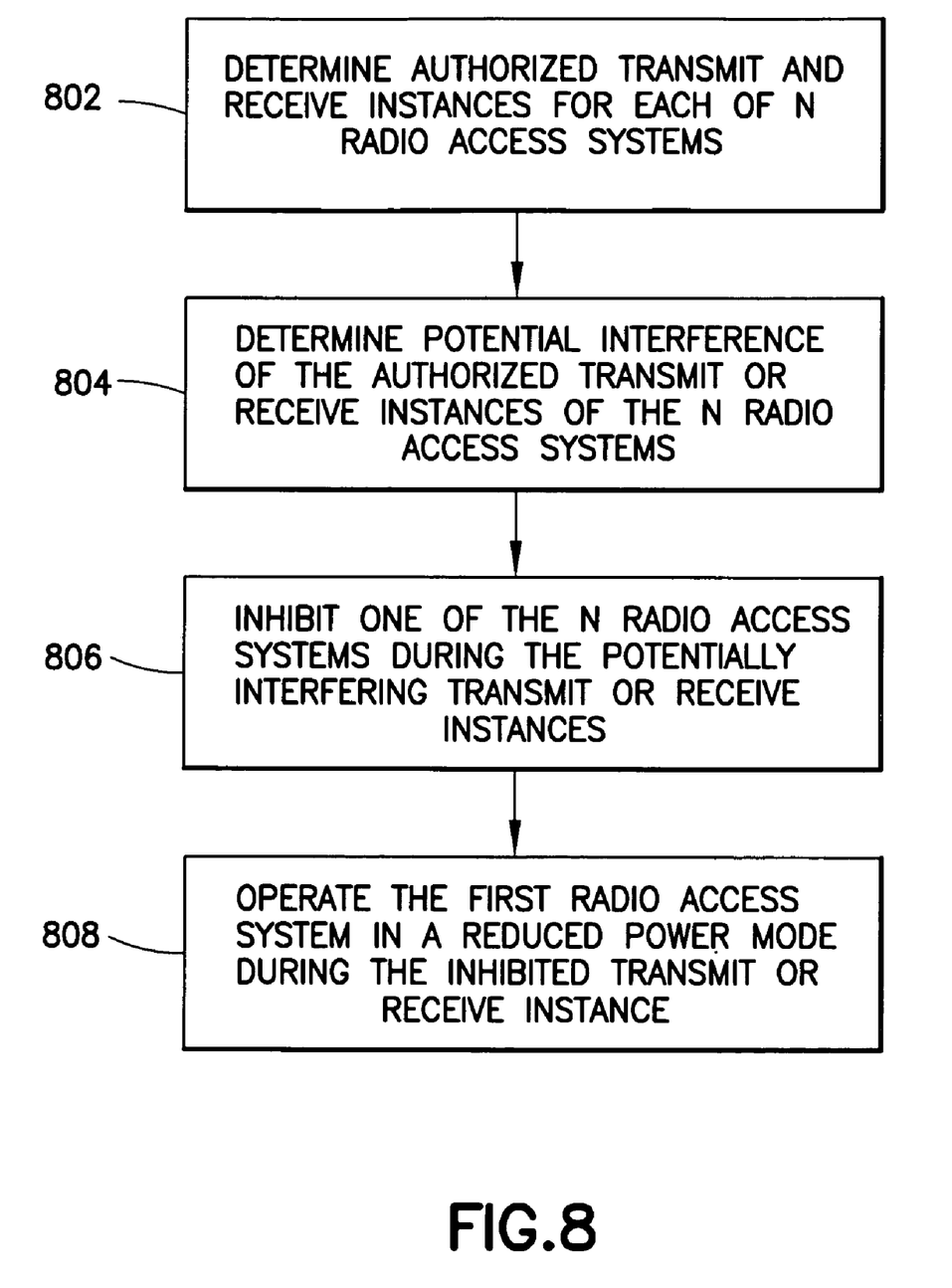
FIG. 8 is a process flow diagram according to another exemplary embodiment of the invention.

As noted above with respect to FIG. 4, the traffic patterns can be used to operate an individual one of the RASs in a reduced power mode, and some reduced power modes were noted there. This is now summarized with respect to FIG. 8. At block 802, the authorized transmit and receive instances for each of N radio access systems of an apparatus are determined, wherein N is an integer at least equal to two. These are generally received piecemeal at each of the N RASs from their respective networks. At block 804, at least one of the authorized transmit or receive instances of a first one of the N radio access systems is determined to potentially interfere with at least one of the authorized transmit or receive instances of another one of the N radio access systems. Note that this is a prediction; there is not actual interference yet. At block 806, the first radio access system is inhibited during the at least one potentially interfering authorized transmit or receive instances. At block 808 the first radio access system is operated in a reduced power mode during the inhibited transmit or receive instance based in the inhibiting.

As seen at FIG. 6, each of the N radio access systems 14, 16 are arranged to be powered by a portable power source of the apparatus 22. As detailed above, the authorized transmit and receive instances for the N radio access systems are generated as N traffic patterns by the multiradio controller 626 of the apparatus, which also writes the N traffic patterns to a memory 612 to be read by the resource manager 628 that controls the reduced power mode. As detailed above, the potential interference is determined as an overlap of time and frequency between the one radio access system's authorized transmit or receive instances and the another radio access system's authorized transmit or receive instances. It is noted that an insufficient frequency spacing is also considered an overlap; the resulting interference is the same as if the frequencies were not spaced at all. Note that in FIG. 4 the disabled transmit/receive instances terminate with an enabled transmit receive instance in the second interval 404. This need not be the case; there may be an inhibited instance followed by a period where transmit or receive activity is not authorized or scheduled. That not-authorized period is not necessarily inhibited because there is no transmit or receive activity scheduled/authorized by the network to take place anyway. But the RAS power saving algorithm may be extended to beyond only the inhibited periods to extend the reduced power mode through that period where transmit or receive activity is not authorized or scheduled. In this embodiment, the first radio access system is operated in the reduced power mode and is only returned to a full power mode immediately prior to a next one of its authorized transmit or receive instances that is not inhibited. It is returned immediately prior in order to be functioning at the proper frequency and sampling rate at the very start of the non-inhibited transmit/receive instance, as some cellular network require. In this manner the power savings in the RAS is extended for the maximum time period possible given network scheduling.

In general, the various embodiments may be implemented in hardware or special purpose circuits, software (computer readable instructions embodied on a computer readable medium), logic or any combination thereof. For example, some aspects may be implemented in hardware, while other aspects may be implemented in firmware or software which may be executed by a controller, microprocessor, ASIC or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g.,

Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention. Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   determining a first traffic pattern for a first radio access system of an apparatus;
   determining a second traffic pattern for a second radio access system of the apparatus, wherein the first and second traffic patterns span a common time interval; and
   restricting operation of at least one non-radio sub-system of the apparatus based on the first traffic pattern and on the second traffic pattern;
   wherein each of the first radio access system, the second radio access system and the non-radio subsystem are arranged to be powered by a portable power source of the apparatus, and restricting operation results in smoothing current peaks drawn from the portable power source due to the combined operation of the first radio access system, the second radio access system and the non-radio sub-system across the common time interval.

2. The method of claim 1, wherein restricting operation comprises restricting operation of the non-radio sub-system to a time at which the first traffic pattern indicates at least no transmit activity for the first radio access system and at which the second traffic pattern indicates at least no transmit activity for the second radio access system.

3. The method of claim 1 wherein the non-radio sub-system comprises at least one of a camera and a camera flash.

4. The method of claim 1, further comprising generating by a multiradio controller of the apparatus both the first and the second traffic patterns, writing the first and second traffic patterns to a memory of the apparatus, and wherein restricting operation comprises a resource manager of the apparatus reading the written first and second traffic patterns from the memory.

5. The method of claim 4, further comprising after writing the second traffic pattern to the memory, the multiradio controller sending to the resource manager an indication that the second traffic pattern is available.

6. The method of claim 4, wherein the resource manager further executes an algorithm that selects the at least one non-radio sub-system from several sub-systems based on optimizing power savings.

7. The method of claim 1, wherein the determined first traffic pattern comprises an instance wherein the first radio access system is inhibited by the multiradio controller from one of transmitting or receiving despite being authorized by a wireless communication network to do so during that instance, in which the inhibiting is due to the second traffic pattern.

8. An apparatus comprising:
   a memory;
   a first radio access system;
   a second radio access system;
   a non-radio sub-system;
   at least one processor configured to determine a first traffic pattern for the first radio access system and store it in the memory, to determine a second traffic pattern for the second radio access system and store it in the memory wherein the first and second traffic patterns span a common time interval, and to restrict operation of the non-radio sub-system based on the first traffic pattern and on the second traffic pattern; and
   a portable power source coupled to provide electrical power to each of the first radio access system, the second radio access system and the non-radio subsystem, and wherein the processor is configured to restrict the operation of the non-radio sub-system so as to smooth current peaks drawn from the portable power source due to the combined operation of the first radio access system, the second radio access system and the non-radio sub-system across the common time interval.

9. The apparatus of claim 8, wherein the at least one processor is configured to restrict operation of the non-radio sub-system to a time at which the first traffic pattern indicates at least no transmit activity for the first radio access system and at which the second traffic pattern indicates at least no transmit activity for the second radio access system.

10. The apparatus of claim 8, wherein the non-radio sub-system comprises at least one of a camera and a camera flash.

11. The apparatus of claim 8, wherein the at least one processor comprises a multiradio controller and a resource manager, wherein the multiradio controller is configured to generate both the first and the second traffic patterns and to write the first and second traffic patterns to the memory, and the resource manager is configured to read the written first and second traffic patterns from the memory and to restrict the operation of the non-radio sub-system based on the read first and second traffic patterns.

12. The apparatus of claim 11, wherein the multiradio controller is further configured, after writing the second traffic pattern to the memory, to send to the resource manager an indication that the second traffic pattern is available.

13. The apparatus of claim 11, wherein the resource manager further executes an algorithm that selects the said non-radio sub-system from several sub-systems based on optimizing power savings.

14. The apparatus of claim 8, wherein the determined first traffic pattern comprises an instance wherein the first radio access system is inhibited by the multiradio controller from one of transmitting or receiving despite being authorized by a wireless communication network to do so during that instance, in which the inhibiting is due to the second traffic pattern.

15. A memory embodying a computer program of instructions for causing a digital processor to perform actions directed toward restricting operation of a non-radio sub-system of an apparatus, the actions comprising:
   determining a first traffic pattern for a first radio access system of an apparatus;
   determining a second traffic pattern for a second radio access system of the apparatus wherein the first and second traffic patterns span a common time interval; and
   restricting operation of at least one non-radio sub-system of the apparatus based on the first traffic pattern and on the second traffic pattern so as to smooth current peaks drawn from a portable power source due to the combined operation of the first radio access system, the second radio access system and the non-radio sub-system across the common time interval.

16. The memory of claim 15, wherein restricting operation comprises restricting operation of the non-radio sub-system to a time at which the first traffic pattern indicates at least no transmit activity for the first radio access system and at which the second traffic pattern indicates at least no transmit activity for the second radio access system.

17. A resource manager comprising:
a first input coupled to read from a memory a first traffic pattern for a first radio access system of an apparatus and a second traffic pattern for a second radio access system of the apparatus wherein the first and second traffic patterns span a common time interval;
logic circuitry configured to determine how to restrict operation of a non-radio sub-system of the apparatus based on the first traffic pattern and on the second traffic pattern so as to smooth current peaks from a portable power source due to the combined operation of the first radio access system, the second radio access system and the non-radio sub-system across the common time interval; and
a control output configured to output to the non-radio sub-system a control signal to restrict the operations as determined by the logic circuitry.

18. The resource manager of claim 17 wherein the logic circuitry is configured to determine how to restrict operation of the non-radio sub-system by determining a time at which the first traffic pattern indicates at least no transmit activity for the first radio access system and at which the second traffic pattern indicates at least no transmit activity for the second radio access system.

19. The resource manager of claim 17 comprising an integrated circuit.

20. A device comprising:
memory means;
first radio access means;
second radio access means;
a non-radio sub-system; and
processing means for determining a first traffic pattern for the first radio access means and for storing it in the memory means, for determining a second traffic pattern for the second radio access means and for storing it in the memory means, in which the first and second traffic patterns span a common time interval, and the processing means is further for restricting operation of the non-radio sub-system based on the first traffic pattern and on the second traffic pattern so as to smooth current peaks from a portable power source due to the combined operation of the first radio access means, the second radio access means and the non-radio sub-system across the common time interval.

21. The device of claim 20, wherein:
the memory means comprises a computer readable memory;
the first radio access means comprises a cellular telephony radio;
the second radio access means comprises one of a piconet radio or a wireless local area network radio;
the non-radio sub-system comprises one of a camera and a flash; and
the processing means comprises a multiradio controller adapted to determine and to store the traffic patterns and a resource manager adapted to determine the restricted operation and to send a control signal to the non-radio sub-system.

* * * * *